US005712971A

United States Patent [19]
Stanfill et al.

[11] Patent Number: 5,712,971
[45] Date of Patent: Jan. 27, 1998

[54] METHODS AND SYSTEMS FOR RECONSTRUCTING THE STATE OF A COMPUTATION

[75] Inventors: Craig Stanfill, Waltham; Cliff Lasser, Cambridge; Robert Lordi, Wayland, all of Mass.

[73] Assignee: Ab Initio Software Corporation, Concord, Mass.

[21] Appl. No.: 570,724

[22] Filed: Dec. 11, 1995

[51] Int. Cl.[6] .................................................. G06F 11/08
[52] U.S. Cl. ........................... 395/183.1; 395/182.13; 364/269; 364/285.2
[58] Field of Search ..................... 395/183.1, 182.04, 395/182.09, 182.11, 182.13, 182.14; 364/221.9, 229.2, 230, 269, 285.2

[56] References Cited

U.S. PATENT DOCUMENTS

| | | | |
|---|---|---|---|
| 4,703,481 | 10/1987 | Fremont | 371/12 |
| 4,823,256 | 4/1989 | Bishop et al. | 364/200 |
| 5,313,584 | 5/1994 | Tickner et al. | 395/275 |
| 5,435,003 | 7/1995 | Chng et al. | 395/575 |
| 5,440,726 | 8/1995 | Fuchs et al. | 395/82.18 |
| 5,499,342 | 3/1996 | Kurihara et al. | 395/200.12 |
| 5,530,802 | 6/1996 | Fuchs et al. | 395/182.15 |
| 5,590,277 | 12/1996 | Fuchs et al. | 395/183.14 |

OTHER PUBLICATIONS

Casas, et al., Mist:PVM with Transparent Migration and Checkpointing, Oregon Graduate Institute of Science & Technology, pp. 1–13, May 1995.

Lutifiyya and Cowan, Depart of Computer Science, University of Western Ontario, pp. 1–18, Feb. 20, 1995.

Goetz Graefe, Query Evaluation Techniques for Large Database, Portland State University, Computer Science Department, pp. 88–94.

IBM, Database 2 AIX/6000 Programming Reference manual, 1993, pp. 282–283.

Apers, Peter M.G., et al., "PRISMA/DB: A Parallel, Main Memory Relational DBMS", Dec. 1992, IEEE Transactions on Knowledge and Data Engineering, vol. 4, No. 6, pp. 541–554.

Boral, Haran, et al., "Prototyping Bubba, A Highly Parallel Database System", Mar. 1990, IEEE Transactions on Knowledge and Data Engineering, vol. 2, No. 1, pp. 4–23.

DeWitt, David J., et al., "The Gamma Database Machine Project", Mar. 1990, IEEE Transactions on Knowledge and Data Engineering, vol. 2, No. 1.,pp. 44–62.

Frieder, Ophir and Chaitanya K. Baru, "Site and Query Scheduling Policies in Multicomputer Database Systems", Aug. 1994, IEEE Transactions on Knowledge and Data Engineering, vol. 6, No. 4, pp. 609–619.

(List continued on next page.)

*Primary Examiner*—Robert W. Beausoliel, Jr.
*Assistant Examiner*—Dieu-Minh Le
*Attorney, Agent, or Firm*—Fish & Richardson P.C.

[57] ABSTRACT

Methods and systems for running and checkpointing parallel and distributed applications which does not require modification to the programs used in the system nor changes to the underlying operating system. One embodiment of the invention includes the following general steps: (1) starting an application on a parallel processing system; (2) controlling processes for the application, including recording of commands and responses; (3) controlling a commit protocol; (4) detecting failures of the application; (5) continuing execution of the application from the most recently committed transaction after "replaying" the recorded commands and responses. A second embodiment comprises the following general steps: (1) starting an application on a parallel processing system; (2) controlling processes for the application, including recurrent recording of the memory image of a driver program that controls the application; (3) controlling a commit protocol; (4) detecting failures of the application; (5) continuing execution of the application from the most recently committed transaction after "restoring" the recorded memory image of the driver program.

12 Claims, 5 Drawing Sheets

OTHER PUBLICATIONS

Graefe, Goetz, "Volcano—An Extensible and Parallel Query Evaluation System", Feb. 1994, IEEE Transactions on Knowledge and Data Engineering, vol. 6, No. 1, pp. 120–135.

Graefe, Goetz and Diane L. Davison, "Encapsulation of Parallelism and Architecture-Independence in Extensible Database Query Execution", Aug. 1993, IEEE Transactions on Software Engineering, vol. 19, No. 8, pp. 749–764.

METHODS AND SYSTEMS FOR RECONSTRUCTING THE STATE OF A COMPUTATION

BACKGROUND OF THE INVENTION

1. Field of the Invention

This invention relates to computer processing systems, and more particularly to methods and systems for reconstructing the state of an interrupted computation in a parallel processing computer environment.

2. Description of Related Art

Computational speeds of single processor computers have advanced tremendously over the past three decades. However, many fields require computational capacity that exceeds even the fastest single processor computer. An example is in transactional processing, where multiple users access computer resources concurrently, and where response times must be low for the system to be commercially acceptable. Another example is in database mining, where hundreds of gigabytes of information must be processed, and where processing data on a serial computer might take days or weeks. Accordingly, a variety of "parallel processing" systems have been developed to handle such problems. For purposes of this discussion, parallel processing systems include any configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

Complex data processing applications running on parallel processing systems typically make changes to multiple external collections of data (files, databases, etc.). Such applications do this by running one or more programs either concurrently or sequentially. If a failure occurs, partial changes may have been made to the external collections of data, which render that data unusable by the current application or other applications. In parallel processing systems, the problem is intensified since the collection of data will often be spread over many different nodes and storage units (e.g., magnetic disks), making the work required to "roll back" the state of the data increase proportionately with the number of storage units. Similarly, the number of programs which must be terminated can be large.

To recover from such failures, it is necessary to shut down the current (i.e., failed) application, and then either:

(1) undo all changes made by the application since its start (a "full rollback"), or (2) restore the state of the system to an intermediate "checkpoint" and restart execution from that point (a "partial rollback").

Partial rollbacks from a checkpoint (also known as "checkpointing") has advantages over full rollbacks, in that less work will be lost if a failure occurs, and partial rollbacks require less information to be retained. However, checkpointing is a complex technical problem, because it is difficult to (1) capture the state of running programs; (2) consistently roll-back the state of all data files being modified; and (3) capture data in transit between programs (e.g., data being sent via a network). The problem is compounded by the fact that, in most cases, application programs must be specially written to provide checkpointing. In general, it is not possible to modify programs not designed for checkpointing to add explicit calls to a checkpointing software package without substantial changes to the source code for the program. Furthermore, most operating systems do not provide facilities to capture data in transit between programs.

Accordingly, there is a need for a method of providing checkpointing for applications which do not specifically provide for checkpointing. The present invention provides such a method that is particularly useful for applications running on parallel processing systems, and is also used for applications running on distributed processing systems.

SUMMARY OF THE INVENTION

The present invention is a method and system for running and checkpointing parallel and distributed applications which does not require modification to the programs used in the system nor changes to the underlying operating system. The invention encompasses two distinct embodiments. The first preferred embodiment comprises the following general steps:

(1) starting an application on a parallel processing system;

(2) controlling processes for the application, including recording of commands and responses;

(3) controlling a commit protocol;

(4) detecting failures of the application;

(5) continuing execution of the application from the most recently committed transaction after "replaying" the recorded commands and responses.

The second preferred embodiment comprises the following general steps:

(1) starting an application on a parallel processing system;

(2) controlling processes for the application, including recurrent recording of the memory image of a driver program that controls the application;

(3) controlling a commit protocol;

(4) detecting failures of the application;

(5) continuing execution of the application from the most recently committed transaction after "restoring" the recorded memory image of the driver program.

The principal features of the inventive architecture are:

(1) Central Control. Applications are run from a central point of control. In the preferred embodiment, a single "driver" program with a single thread of control instantiates and monitors all programs and data collections which form the application.

(2) Control via Host and Agents. To allow for distribution of processing over multiple nodes, a program called an "agent" is used to actuate changes on remote nodes. In the preferred embodiment, a separate agent is instantiated on each node. Overall control of the system is maintained by a "host" program, which manages communications with the driver program and agents, and maintains the global system state.

(3) A Single Command Channel. A "command channel" is maintained between the driver program and the host program. In the preferred embodiment, the driver program effects changes on the system solely through a set of commands and replies using the command channel.

(4) Recording of Command Channel Traffic or Memory Image. In the first embodiment, all commands and replies passing over the command channel are recorded by the host program and saved in non-volatile storage. In the second embodiment, the memory image of the driver program that controls the application is recurrently recorded by the host program and saved in non-volatile storage.

(5) Transaction-based Control. In the preferred embodiment, all operations performed via the command channel use a commit protocol (preferably a two-phase commit protocol) to ensure global atomicity.

(6) Recovery With Recapitulation. Using the above mechanisms, the invention provides the ability to "recover" a failed application by simply rerunning it. Briefly stated, the state of all data is restored via the commit protocol, then either the recorded traffic on the command channel is used to "trick" the driver program into believing the driver program is executing the application de novo, or the memory image of the last known good state for the driver program is restored. Owing to the deterministic nature of single-threaded computer programs, the driver program will of necessity end up, as of the last known good state, in the same state as it did the first time the program was run.

The principal intended use of the invention is in traditional data processing applications (e.g., accounting systems, batch transaction systems, etc.), but the invention could be applied to almost any computer application which makes changes to files or databases.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 2b is block diagram showing a failure during execution of the checkpointed program of FIG. 2a.

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Overview

Figure 1:
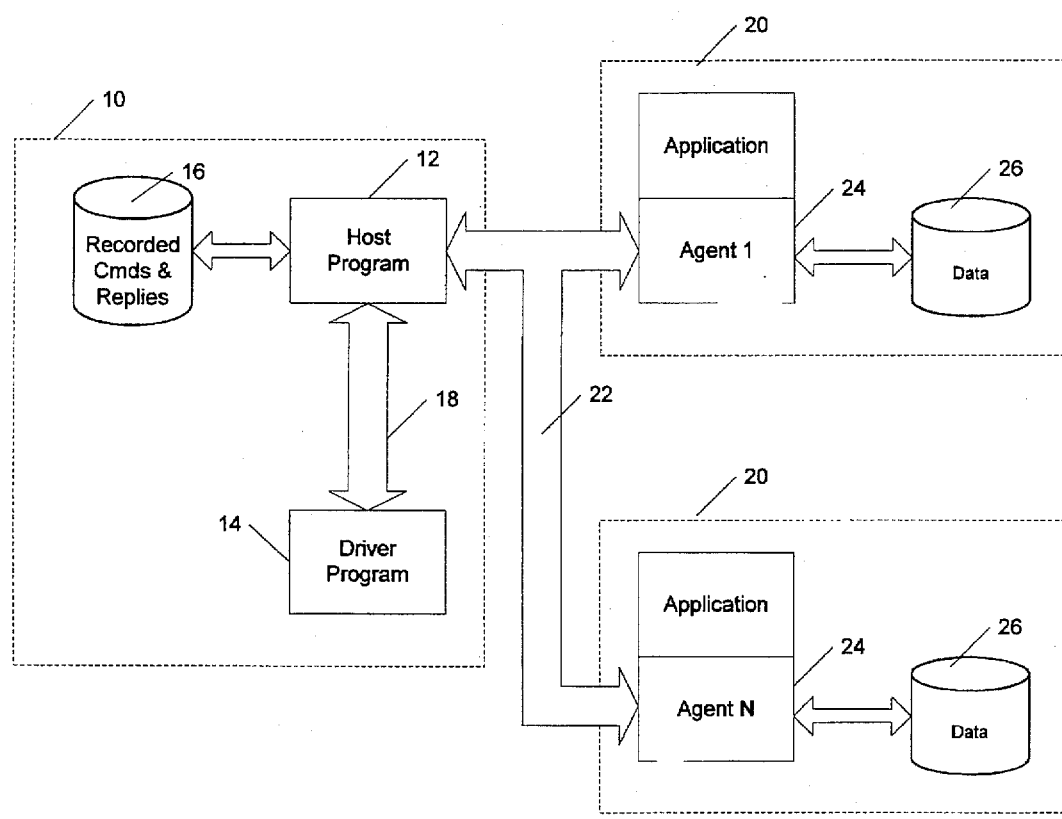
FIG. 1 is a block diagram showing the software components and the flow of control of a checkpointing system in accordance with the present invention.

FIG. 1 is a block diagram showing the software components and the flow of control of a checkpointing system in accordance with the present invention. A host system 10 includes a host program 12, a driver program 14, and a data storage system 16 for recording commands and replies. The host program 12 and driver program 14 are intercoupled by a command channel 18 (which may be, for example, a logical channel on a physical bus). In the preferred embodiment, the host program 12 is actually an object within the address space of the driver program 14. A separate process running the host program could be implemented instead. However, the division into a 'host program' and a 'driver program' is a convenient way to describe the architecture of the present invention.

The host system 10 is coupled to at least one remote system 20 by means of an agent communication channel 22 (which may be, for example, a logical channel on a conventional physical data link 22). Within each remote system 20 is an agent 24 which is coupled to remote data storage 26.

All components shown in FIG. 1 are active during normal execution. The driver program 14 issues commands to the host program 12 to effect operations on applications on various remote systems 20. The host program 12 responds to such commands by issuing commands to one or more agents 24 to perform the requested operations. The agents 24 reply back to the host program 12 when the operations are completed, and the host program 12 in turn replies back to the driver program 14. All commands and replies between the driver program 14 and host program 12 are recorded in the data storage system 16.

Figure 2A:
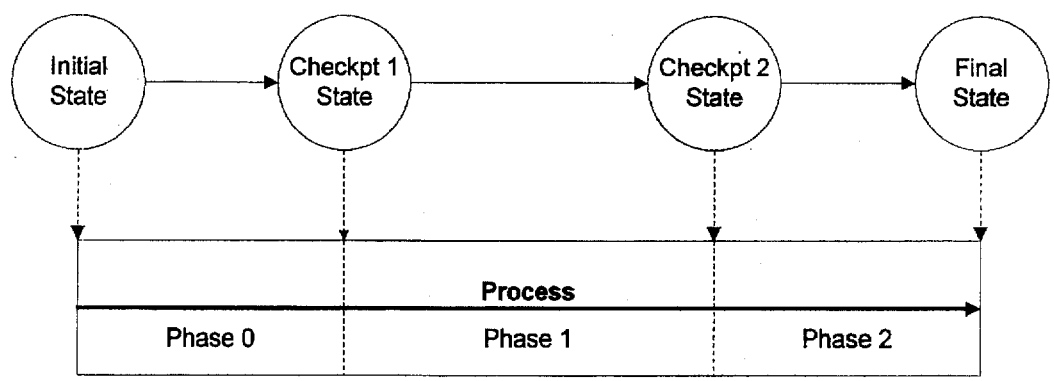
FIG. 2a is block diagram showing normal execution of a checkpointed program in accordance with the present invention.

FIG. 2a shows normal execution of a checkpointed system in accordance with the present invention. In the example shown, the application executes in three phases, beginning in an Initial state 0, proceeding through Phase 0 to a Checkpoint 1 state, then proceeding through Phase 1 to a Checkpoint 2 state, and then through Phase 2 to a Final state.

Figure 2B:
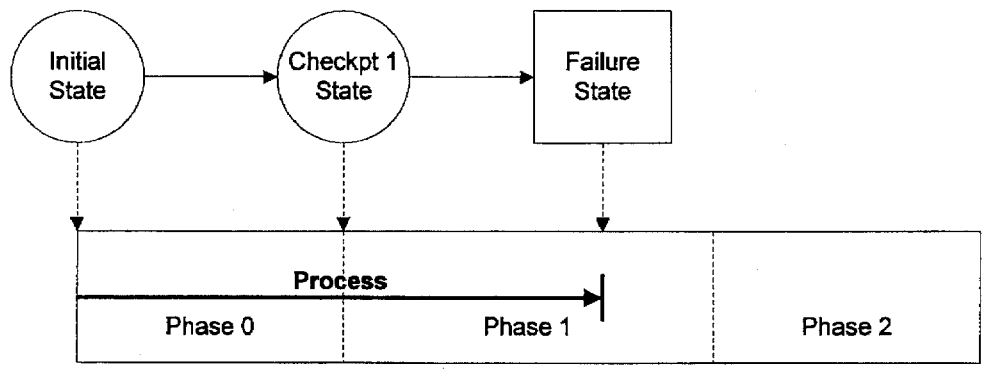

FIG. 2b is a block diagram showing a failure during execution of the checkpointed program of FIG. 2a. A failure may occur, for example, if one of the nodes "crashes" and has to be restarted. In the example shown, sometime after the Checkpoint 1 state has been reached, a failure occurs. Execution is halted in the middle of Phase 1, leaving the external state of the parallel processing systems in an undesirable Failure state.

Figure 2C:
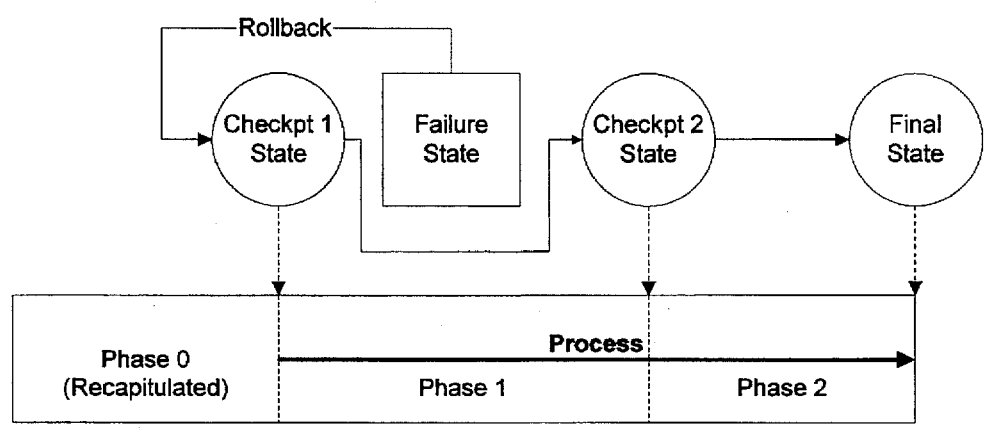
FIG. 2c is block diagram showing recovery from the failure of FIG. 2b.

FIG. 2c is a block diagram showing recovery from the failure shown in FIG. 2b using the present invention. When the application is recovered by re-executing it, operations performed in failed Phase 1 are rolled back, returning the external state of the processing system to the state that existed at the Checkpoint 1 state. All completed phases (in this example, Phase 0) are then "recapitulated" or "restored". In recapitulation, the driver program 14 restarts from its initial state and functions normally. However, no external state changes occur until the driver program 14 reaches the same state that existed at the Checkpoint 1 state. In restoration, a saved image of the driver program 14 is restored and then functions normally from that point. Thereafter, the failed phase (Phase 1 in this example) and all subsequent phases are executed normally, taking the application through the Checkpoint 2 state and thence to the Final state.

Figure 3:
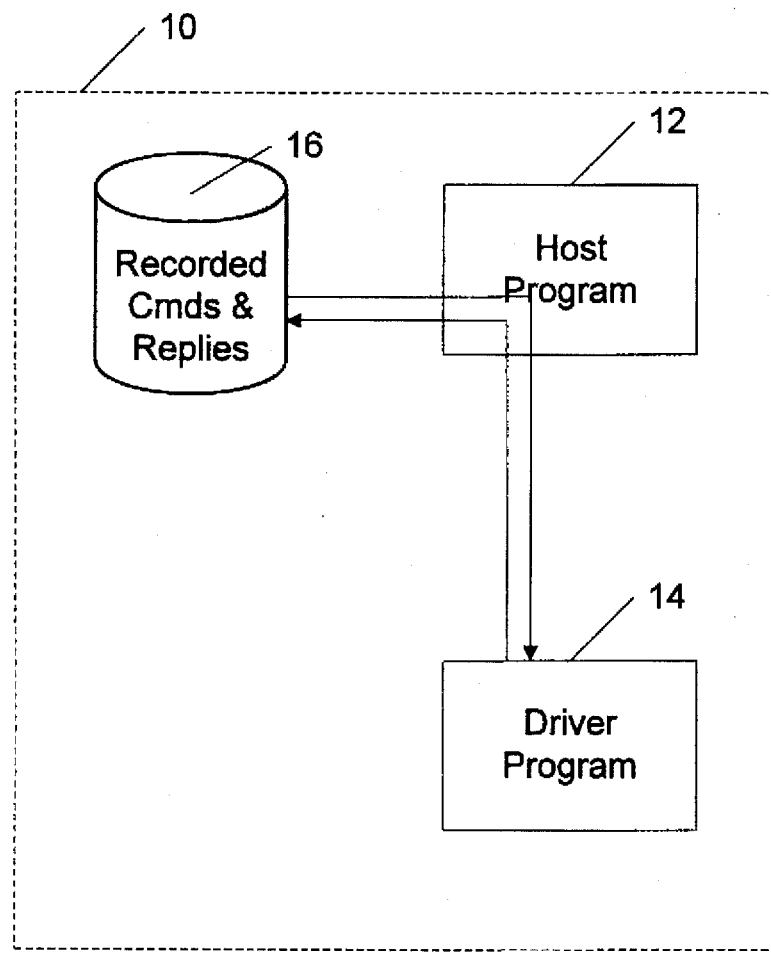
FIG. 3 is block diagram showing the software components and the flow of control of a checkpointing system during recovery from a failure in accordance with the present invention.

FIG. 3 is a block diagram showing the architecture of a checkpointing system in accordance with the present invention during recapitulation. During the recapitulation mode, the driver program 14 starts over from the Initial state. Each command from the driver program 14 is reissued to the host program 12, which matches that command to recorded commands and replies previously stored in the data storage system 16. As long as the sequence of commands from the driver program 14 matches the recorded commands, the corresponding recorded replies can be fed back by the host program 12 to the driver program 14, in effect "tricking" the driver program 14 into thinking that the phases being recapitulated are in fact executing normally. However, no data is actually transformed, moved, etc. Thus, the recapitulation stage proceeds extremely fast, until the driver program 14 reaches the last known good checkpoint state. At that point, the host program 12 switches out of the recapitulation mode, and back into the normal operating mode, supplying commands from the driver program 14 to agents 24 in the remote systems 20, in normal fashion.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

The Driver Program

The invention uses a driver program 14 that provides supervisory functions for setting up and controlling execution of one or more existing non-checkpointing programs. Additional functions may be included if desired. In the preferred embodiment, the driver program 14 performs at least the functions defined below:

(a) Start Job. When the driver program 14 starts, it requests that the host system 10 instantiate the host program 12. The host system 10 responds by providing the driver program 14 with an identifier or pointer to a command channel 18 for communication with the host program 12 and the data storage system 16. The driver program 14 connects to the host program 12 over the command channel 18 and issues a "Start Job" command to the host program 12. This command includes the name of a "recovery file" to be established by the host system 10 in the data storage system 16. (In some implementations, 'connecting' may require starting a separate process; in other implementations, 'connecting' only requires initializing some internal data structures. In either event, the first action is always to start a job as described.)

(b) Commands. The command channel 18 accepts at least the following commands from the driver program 14:

(1) Remote Procedure Call. This call causes a command to be executed by a remote agent 24. The Remote Procedure Call (RPC) command specifies the node on which the command is to be executed. If no agent is currently running on that node, the host program 12 starts up a remote agent 24 on that node.

(2) Start Process. This command causes a process to be started by an agent 24. Again, the command specifies the node on which the process is to be run. If no agent is currently running on that node, the host program 12 starts up a remote agent 24 on that node.

(3) Wait. This command causes function execution of the driver program 14 to be suspended until all processes have finished execution.

(4) Prepare; Commit; Rollback. These three commands have their usual prior art meaning with regard to a conventional two-phase commit transaction processing protocol.

(c) Receipt of Replies. Every command results in exactly one message in reply. Commands and replies may be arbitrarily intermixed (e.g., several commands may be issued before corresponding replies come back). The driver program 14 accepts at least the following replies from the host program 12:

(1) Remote Procedure Call Reply. The contents of this message are specific to the procedure which was invoked by an RPC command.

(2) Process ID. When a process is started on a system (host 10 or remote 20), the system replies with an identifier for that process.

(3) Wait Status. An indication as to whether the various processes terminated successfully.

(4) Prepare/Commit/Rollback Status. A success or failure status indicator.

(d) Abort. This command signifies that execution is to be halted. The host program 12 will attempt to perform a rollback (this may fail if, for example, one of the nodes involved in the computation has crashed). Whether or not the rollback succeeds, the command channel 18 is typically destroyed. An Abort may be manually issued by the driver program 14 if, for example, the driver program 14 detects a run-time failure. An Abort may also be implicitly issued if the driver program 14 fails.

(e) Finish Job. This command signifies that no more work is to be done. The command channel 18 is typically destroyed, and all changes made by the application become irrevocable.

(f) Additional Commands. Additional commands may be added as desired, but are not important for purposes of this disclosure.

Importantly, the driver program 14 divides execution of an application into a series of "phases," such that all processes are required to quiesce (e.g., exit or reach an idle state with no outstanding data transfers) between phases. A phase consists of the following steps:

(1) The driver program 14 issues a series of RPCs (e.g., to set up data files, etc.), which will be needed by one or more application programs.

(2) Optionally, the driver program 14 issues a series of Start Process commands.

(3) If any processes have been started, then after a desired number of processes have been started, the driver program 14 issues a Wait command, and suspends operation until the wait is complete, thus giving time for the processes to complete. In general, all processes that need to cross-communicate with other processes should be started concurrently.

(4) The sequence of steps (1)–(3) may be repeated several times, if desired.

(5) The driver program 14 issues Prepare and Commit commands, causing the current transaction to be committed and any changes made during the current transaction to become permanent.

(6) Further phases of execution follow.

A key step is issuing the Wait command on a recurring basis, since after this command terminates it is guaranteed that there are no active application programs in the system, and that there is no data in transit in communication channels. This characteristic allows the invention to work around the difficulties inherent in capturing the states of running programs and capturing data in transit in communication channels.

A consequence of this design is that checkpoints may not be created while programs are running. If one of the application programs runs for several hours, then there will necessarily be a period of several hours when it is not possible to create a checkpoint. It is the responsibility of the driver program 14, which will often be written by a user of this system, to ensure that the run-time of any phase is not excessive.

There are two techniques in the prior art which may be used to reduce the duration of phases. The first technique is to reduce the use of "pipelining" between successive stages of processing within a phase. Specifically, it is common practice to compose applications from component programs by linking them via communication channels, a technique called "pipelining." Both component programs would necessarily run in the same phase. If this would result in too long a phase, then the writer of the driver could substitute temporary files for the communication channels, and run each component program in a separate execution phase. The second technique is to divide the data more finely. For example, rather than processing a single file with 10 gigabytes, one might divide it into 10 sub-files of 1 gigabyte each, and process each sub-file in a single execution phase. Owing to the fact that the run-times of most applications is roughly proportional to the lengths of their input files, this method might achieve, e.g., a 10-fold decrease in the duration of phases, greatly improving the frequency with which checkpoints may be created. (In prior art, this additional subdivision has been done on an ad-hoc basis, and has generally required the modification of programs and perhaps the writing of additional software. Reference is made to the co-pending patent application entitled "Overpartitioning System and Method for Increasing Checkpoints in Component-based Parallel Applications", assigned to the assignee of the present invention, in which some general methods are explained by which this subdivision may be accomplished without modification to the original programs.)

State Databases (SDB)

The host system 10 creates a state database for itself (the "Host SDB"). Each agent 24 also creates its own state database (the "Agent SDBs"). The Host SDB is used to record command channel traffic when using the recapitulation embodiment of the present invention, to record which phase is being executed, and to record information needed for commit processing. The Agent SDBs are used to record information for recovery processing and commit processing. In the preferred embodiment, an SDB exists in memory only for the life of the program which accesses it. However, all changes to the SDB are recorded sequentially in an ordered journal file (a "log") in non-volatile storage, such as the data storage system 16. At any time, an SDB can be reconstructed in memory from the corresponding log. In the preferred embodiment, the log is the only persistent storage associated with an SDB. Reconstruction of an SDB is performed by starting with an empty database and reading from the log a series of changes to the database, and reflecting the changes in the in-memory database contents.

In the preferred embodiment, all entries to an SDB are in the form of a pair of text strings: a key and a value. When writing an entry (a "Put"), the calling program supplies a key/value entry which is stored in the database. If an entry having the identical key existed before the Put operation, it is replaced. When reading an entry (a "Get"), the calling program supplies a key, and if an entry exists having that key, its value string is returned. In addition, in the preferred embodiment, the SDB interface allows for the creation of lists, which are sequences of entries which can be accessed sequentially rather than by key. List entries are normal string values.

A user "opens" an SDB by supplying the name of a log file. If the log file exists, it is read, and the corresponding SDB is reconstructed from the log contents. If the log file does not exist, a log file is created and an SDB is created in memory as an empty data structure. The SDB is then available for Put and Get operations until it is closed. Closing a database is effected explicitly using a Close operation, or implicitly if the accessing program ceases to exist.

In the preferred embodiment, all operations on an SDB are grouped into "transactions". Any Get or Put will start a new transaction if one is not in progress. A transaction continues through subsequent Puts or Gets, until:

(1) An SDB Commit operation is performed.

(2) An SDB Rollback operation is performed, which cancels the effects of the entire transaction on the SDB.

(3) The SDB is closed, which implicitly rolls back any active transactions to the last known good state.

In the preferred embodiment, transactions on an SDB are not part of the global commit architecture, and have a much finer granularity.

The Host Program

When the driver program 14 starts a job, the host system 10 creates a command channel 18 to permit communication between the driver program 14 and a host program 12. The host program 12 handles data at the host system 10 end of the command channel 18. There is one host program 12 for each application. The host program 12 operates as follows:

(a) Starting a Job. In the preferred embodiment, the following functions are performed by the host program 12 at the start of an application:

(1) Job ID. The host program 12 creates a unique identifier called the "Job ID" using the Internet address of the system on which the host program 12 is running, a time stamp, and the process ID of the host program 12.

(2) Host SDB. The host program 12 creates the Host SDB, using the Job ID as an identifier. In the preferred embodiment, the Job ID is stored in the Host SDB.

(3) Recovery File. The host program 12 also writes a file called a "recovery file" to the data storage system 16 at the start of its execution. This file also contains the Job ID, which can be used to open the Host SDB.

(b) Remote Nodes and Agents. The host program 12 starts processes and operates on files/databases via one or more agents 24. Each agent 24 establishes a bidirectional connection (an agent command channel 22) with the host program 12, for transmitting commands to the agent 24 and receiving replies from the agent 24. An agent 24 is started on each remote system 20 where application programs will be run or on which files or other data collections are located. In the preferred embodiment, agents 24 are started on an as-needed basis, instead of all at once at the start of an application.

(c) Execution of Phases. The host program 12 uses agents 24 to implement the division of execution of a non-checkpointing application into phases, as directed by the driver program 14. The host program 12 is responsible for the transactional mechanisms which implement this division, and performs certain bookkeeping and coordination functions, as described below.

In the preferred embodiment, phases are numbered starting at zero. A phase is always in one of four "states": RUNNING, ERROR, PREPARED, or COMMITTING. When a new phase is started, it is in the RUNNING state. It continues in the RUNNING state as remote operations are performed during the phase.

The current phase number and its state are recorded in the Host SDB. This information is recorded at every state transition. At any time during the phase, the driver program 14 can invoke the Rollback function. This function causes the effects of all operations performed so far during a current phase to be nullified, returning all changed state back to what it was at the start of the phase, and putting the phase into the RUNNING state.

During each phase, while in the RUNNING state, the driver program 14 may issue Start Process and Remote Procedure Calls (RPC) commands to the host program 12. The host program 12 forwards those commands to the appropriate agent 24, gathers replies from each agent 24, and sends the replies to the driver program 14. In the recapitulation embodiment of the present invention, all of these commands and corresponding replies are recorded in the Host SDB. This information is used for the "recapitulation mode", described below.

Once all processes started by the driver program 14 have exited, the driver program 14 can invoke the Prepare function, putting the current phase of an application into the PREPARED state. Following this, the driver program 14 can invoke the Commit function, which causes all effects of all operations performed during the phase to be completely, correctly, and irrevocably made, thus ending the phase. The Rollback function can also be called in the PREPARED state, with the same effect as if called before the Prepare function.

The preferred embodiment of the present invention uses a conventional two-phase commit protocol. In the preferred recapitulation embodiment, the two-phase commit protocol is as follows:

(1) Prepare. The Prepare command is performed by the host program 12 by:
1) Storing the recorded command channel data from the current phase in the Host SDB, using a key containing the current phase number. If such information already existed (e.g., due to a prior execution of the same phase which failed during commit processing), it will be overwritten.
2) Sending a Prepare command from the host program 12 to each agent 24 which executed commands during the phase. Each agent 24 will, in accordance with the conventional two-phase commit protocol, enter a PREPARED state such that, at any subsequent time, it may either execute a Rollback command which will restore the state of all resources under the control of the agent 24, or a Commit command which will make permanent all changes to all resources under the control of the agent 24. This PREPARED state must be durable, i.e., it must be possible to reconstruct the prepared state after a system failure, and then to either execute a Rollback or a Commit operation. When the PREPARED state has been attained, each agent 24 will signal this fact by responding to the Prepare command.
3) Waiting for all agents 24 to indicate successful completion of the Prepare command.
4) Setting the state of the host program 12 to PREPARED, and noting that change in the Host SDB.

(2) Commit. The Commit command is performed by:
1) Setting the state of the host program 12 to COMMITTING, and noting that change in the Host SDB.
2) Sending a Commit command to each agent 24 which executed commands during the phase. Each agent 24 will then cause all changes to all resources under its control to become permanent, possibly erasing information which might have been required in the event of a rollback. When such processing is complete, it will signal this fact by responding to the Commit command.
3) Waiting for all agents 24 to indicate successful completion of the Commit command.
4) Setting the state of the host program 12 to RUNNING, incrementing the phase number, and noting these changes in the Host SDB.

During the RUNNING or PREPARED state, if an error condition is detected by the operating system or the application, the phase will be placed in the ERROR state. In the preferred embodiment, while in this state, no further remote operations can be performed, nor can the state of the phase be changed, nor can a new phase be started. In the preferred embodiment, the only legal actions at this point are:

(1) Debugging. The driver program 14 may use some informational commands to debug the application and/or gather diagnostic information, in known fashion.

(2) Exiting. As the driver program 14 exits, the host program 12 may attempt to issue a Rollback command on behalf of the driver program 14.

(3) Rollback. The driver program 14 may issue a Rollback command, which will place the system in its state as of the start of the current phase, undoing any changes to files/databases, as described above.

In summary, the legal state changes for the host program 12 are as follows:

(1) Initial state: RUNNING.
(2) In any state other than COMMITTING, an error condition causes transition to the ERROR state. This state may be exited by a Rollback command, which will place the system in the RUNNING state, or if the driver program 14 exits.
(3) In the RUNNING state, a Prepare operation causes transition to the PREPARED state. During the RUNNING or PREPARED state, a Rollback operation causes the phase to be undone, in which case the phase number stays the same, and the system transitions back to the RUNNING state.
(4) In the PREPARED state, a Commit operation causes transition to the COMMITTING state. This state endures for the duration of the Commit operation, then advances the phase number, ending the current phase and starting a new phase in the RUNNING state. Once the Host SDB records the transition to the COMMITTING state, the detection of an error will cause the system to abort. Upon restarting the system, the COMMIT operation will be completed. No rollback is possible while in the COMMITTING state.

After completion (committing) of all phases of the application, the driver program 14 issues a Close command, which indicates that the application has successfully completed. This operation deletes the recovery file and the Host SDB.

In the restoration embodiment of the present invention, the procedure is similar, but with several exceptions. First, commands and replies are not stored in the Host SDB. Rather, after the Prepare command has been issued by the driver program 14 and executed by the host program 12 and agents 24, a memory image file of the driver program 14 is stored, preferably to non-volatile storage such as a disk drive, in known fashion. The memory image comprises either the entire address space (including swap files, etc.) for the driver program 14, or only those critical data structures of the driver program 14 (as determined by a programmer for a particular implementation of the driver program 14) necessary to recreate a saved state for the driver program 14. Once writing of a memory image file is confirmed (for example, by comparing the program image still in memory to the stored image file) and the system enters the Prepared state, the Commit command is issued by the driver program 14 and executed by the host program 12 and agents 24, as above. In the preferred embodiment, a next memory image file is written and confirmed before a prior memory image file is deleted (i.e., "A" and "B" copies are maintained, in known fashion). A prior memory image file should be deleted only after a Commit operation completes.

(d) Recovery. Any application which terminated without having executed the Close operation is considered to have failed. When the application is restarted, recovery is triggered. In the preferred embodiment, whenever a host program 12 is started, it checks for the existence of a recovery file. In the preferred embodiment, if the file exists, the host program 12 assumes that a prior failure occurred, and that the intent is to restart the prior job.

The first step in recovery is to restore all files and databases to their most recently committed state. If the Host SDB indicates a state of RUNNING, ERROR, or PREPARED, then the host program 12 issues a Rollback command, causing all uncommitted operations to be undone, in known fashion. If the Host SDB indicates a state of COMMITTING, the host program 12 re-issues the Commit command, completing what was evidently an interrupted Commit operation.

In the recapitulation embodiment of the present invention, the host program 12 then enters the recapitulation mode. As noted above, the driver program 14 interacts with the rest of the system via a single command channel 18, the traffic on which is automatically stored in the Host SDB during Commit processing, using a key containing the appropriate phase number. When recapitulating the phase, the host program 12 will start by retrieving the saved command channel traffic from the Host SDB. For recapitulation, the driver program 14 is restarted from its initial state, and functions normally. For the duration of recapitulation, all commands sent by the driver program 14 are discarded by the host program 12 (after, for safety sake, comparing them with the recorded command message traffic; however, this is optional). Whenever the driver program 14 expects to receive a reply message via the command channel 18, a reply is fetched by the host program 12 from the recorded incoming reply traffic on the data storage system 16 and immediately provided to the driver program 14. Owing to the deterministic nature of single-threaded computer programs, this process will result in the driver program 14 executing the same sequence of commands as it did during the failed run, and the controlled application program will end up in the same state as it did on the previous ran.

When the recorded command channel traffic from all committed phases has been replayed, it is guaranteed that:

(1) The driver program 14 has been restored (by recapitulation) to its state as of the most recent Commit operation; and (2) All files and databases have also been restored (by use of the two-phase commit protocol) to their state as of the most recent Commit operation.

Thus, the system's state is restored and execution may proceed normally.

In the restoration embodiment of the present invention, the procedure is somewhat different:

(1) If the Host SDB indicates a state of PREPARED and there are two saved memory image files (A and B), then the host program 12 deletes the newer file (thus prohibiting a double Commit possibility), issues a Rollback command, and reloads into memory the older image file (i.e., the last known good saved image of the driver program 14). If the Host SDB indicates a state of PREPARED and there is one saved memory image file (A or B), then the host program 12 issues a Rollback command and reloads into memory that image file.

(2) If the Host SDB indicates a state of COMMITTING, then the host program 12 issues a Commit command and reloads into memory the newest image file.

(3) If the Host SDB indicates a state of RUNNING or ERROR and there are two saved memory image files, then the host program 12 issues a Rollback command and reloads into memory the newer image file; if there is one saved memory image file, then the host program 12 issues a Rollback command and reloads into memory that image file.

In any event, the host program 12 then re-establishes the command channel 18 and resumes execution of the driver program 14.

The restoration protocol guarantees that:

(1) If failure comes before entering the COMMIT state, a Rollback is performed and the oldest (pre-PREPARE state) memory image is used. If failure comes while in the COMMIT state, the Commit operation is finished and the newest (post-PREPARE state) memory image is used. If failure comes after entering the COMMIT state, a Rollback is performed and the newest (post-PREPARE state) memory image is used.

(2) All files and databases have also been restored (by use, for example, of the two-phase commit protocol) to their state as of the most recent Commit operation.

Thus, the system's state is restored and execution may proceed normally.

Agents

The description below applies to each agent 24 started by the host program 12. The term "local node" is used to indicate the system on which a particular agent 24 is running.

Each agent 24 performs the actual operations necessary to execute an application. An agent 24 is responsible for performing operations only on the remote system 20 on which it is running. These operations include execution of remote procedure calls, committing and rolling back such operations, and creating and monitoring processes. An agent 24 may be considered to reside "between" an application and the operating system in the sense that an agent 24 controls when and how an application can execute.

Commands are sent by the driver program 14 to an agent 24 via the host program 12 in the form of Remote Procedure Calls (RPCs). In the preferred embodiment, an RPC command consists of a command identifier followed by a series of arguments, all of which are text strings. The agent 24 contains a table mapping RPC command identifiers to "RPC handlers," where the handler is an object enabling the invocation of subroutines to perform the RPC, to commit the RPC, and to rollback the RPC. The agent 24 thus handles the RPC by locating the appropriate RPC handler, then providing that RPC handler with the RPC's arguments. The RPC handler routine parses the argument strings and performs the requested operation. Following this, the RPC handler routine produces a reply string which is sent back to the driver program 14 via the host program 12. Each reply string includes information on the success of the command and any requested return data. In the preferred embodiment, a special RPC is used to start processes, as explained below.

When an agent 24 is started, the first RPC command it receives is a Start Agent command. This command notifies the agent 24 of the Job ID for the application, and assigns to the local node a unique "Node ID". The agent 24 then opens a state database called the "Agent SDB". The Agent SDB name is derived from the Job ID and the Node ID, and so is unique throughout the application.

Each agent 24 tracks the phases of the application along with the host program 12. When the host program 12 performs a Prepare or Commit operation, it does so by sending Prepare Node and Commit Node RPC commands to each of its agents 24. In the preferred embodiment, the driver program 14 will only consider the application as a whole to be in the PREPARED state once all agents 24 have successfully responded to their individual Prepare Node commands. Similarly, the application will only consider a phase committed and advance to the next phase when all agents 24 have successfully responded to their Commit Node commands.

Each agent 24 records the current phase and as state in its Agent SDB. The four defined states and the allowed state changes are as in the host program 12, and in the normal case, track those of the host program 12. The current phase state (and the current phase number) can be retrieved by the driver program 14 using a "NodeState" RPC command.

When the driver program 14 invokes the Close function, it issues a Close command to each agent 24. Each agent 24 responds by verifying that the local phase state is running and that no processes are executing, and then deletes its associated Agent SDB.

In the preferred embodiment, each agent 24 performs RPC operations which are part of the phase and therefore are subject to the commit/rollback transaction architecture. To do this, each agent 24 makes use of its Agent SDB. Specifically, for each phase, an agent 24 creates in its Agent SDB a list called the "CR_LIST", into which an entry is placed for each operation. Each entry carries enough information to undo the operation, in known fashion. The list is preferably ordered so that the operations can be undone in the reverse order in which they were performed.

In the preferred embodiment, for uniformity, all RPCs must conform to the following restrictions:

(1) If an RPC changes the state of a file/database, it must save any information which may be required to roll back changes to that file/database, and create an entry in the CR_LIST. This entry must contain the identity of the RPC command being executed, so that the appropriate RPC handler may be located during commit/rollback processing.

(2) Each RPC handler must provide a means of implementing the Prepare, Commit, and Rollback operations (which may be Null operations if the RPC does not make changes to any databases or files).

(3) Each RPC handler may optionally use the SDB of each agent 24 to store any information needed to fulfill these requirements.

(4) No special action is required for RPCs that do not change the state of files/databases.

In the preferred embodiment, application programs must obey the following rules:

(1) If a process modifies files/databases, it must provide a means of rolling back changes and of implementing the Prepare/Commit/Rollback operations. Processes under control of an agent 24 also have access to the agent's SDB. For example, the application program may create entries on the $CR_{13}$ LIST. Such entries must contain the identifier for an RPC command which implements the appropriate commit/rollback operations. However, in this case, an RPC did not actually take place, so an identifier for a "dummy RPC" is entered.

(2) Alternatively, the driver program 14 may issue RPCs on behalf of a process which will have the same effect.

The Start Process command to the agent 24 causes the agent 24 to run a specified application program image file, thus starting a "process" on the local node. In the preferred embodiment, the arguments to this command supply:

(1) The executable image file for the program.

(2) The program's argument list.

(3) Any operating system environment information required by the program.

(4) Files or pathnames to be opened for the process for use as its standard input, output, and error channels.

(5) The exit status code with which the program should exit to indicate successful execution.

(6) A debug mode (debugging is described below).

Each agent 24 maintains a list of all processes under its control. As processes are started, identifiers for those processes are added to this list.

In the preferred embodiment, each agent 24 does not wait for the termination of a process before replying to the driver program 14. Each agent 24 allows the process to execute concurrently with the agent 24, while monitoring execution of the process. At all times, an agent 24 is aware of the "process state" of the process, which is one of PS_RUNNING, PS_ERROR, PS_DEBUG, or PS_EXITED in the preferred embodiment.

The PS_RUNNING state indicates that a program process is executing without known problems. The PS_ERROR state indicates that the process is known to have encountered an unresolvable problem, and has either (1) signaled an error condition (a signal or error trap), (2) exited with an error status indicating failure, or (3) exited in an abnormal manner (e.g., by aborting or by being manually terminated by an operator). The PS_EXITED state indicates that the process has successfully completed execution and has terminated itself normally. The PS_DEBUG state is described under "debugging" below.

In the preferred embodiment, the driver program 14 can interrogate the state of a process using a "ProcState" RPC command. Each agent 24 also maintains an aggregate process state, indicating the state of all processes it has been commanded to start as a whole. This aggregate state is called the "node process state," and is distinct from the node's commit/rollback state (RUNNING, PREPARED, COMMITTING, ERROR). The node process states are the same as the four process states and are defined as follows:

(1) if any process is in the PS_DEBUG state, then the aggregate state is PS_DEBUG, otherwise, (2) if any process is in the PS_ERROR state, then the aggregate state is PS_ERROR, otherwise, (3) if any process is in the PS_RUNNING state, then the aggregate state is PS_RUNNING, otherwise, (4) the aggregate state is PS_EXITED (all processes have exited normally).

Transitions in the node process state affect the node's commit/rollback state. Specifically, if the node process state transitions into the PS_ERROR, state, then the node's commit/rollback state will automatically transition to the ERROR state. Additionally, it is only legal to transition from the RUNNING state to the PREPARED state, or from the PREPARED state to the COMMITTING state if the process state is PS_EXITED.

The aggregate process state can be retrieved by the driver program 14 using the NodeState agent command.

In the preferred embodiment, processes may emit error messages through standard error I/O channels. For example under UNIX, this is the "stderr" I/O file. Such output may be optionally routed to the agent 24 from any process, and is available to the driver program 14 via an "Eread" RPC command.

The driver program 14 is often in a circumstance where it cannot continue execution until all processes started on a node or set of nodes complete execution. To accommodate this circumstance, the agent 24 supports a "Wait" command from the driver program 14. The Wait command causes an agent 24 to delay its reply until the node process state ceases to be the PS_RUNNING state (i.e., the state is PS_DEBUG, PS_ERROR, or PS_EXITED). The reply to the Wait command indicates the processes that caused the Wait condition to terminate. The driver program 14 can also cancel the Wait condition by sending a "sync" RPC command to the agent 24 during the Wait condition. The Sync command works whether or not an intervening wait reply is accidentally received (because the wait reply and the sync command crossed in the command channel 18).

Process Debugging

From time to time, it is useful for the driver program 14 to allow the user to debug a particular process in the system. Debugging entails running a process under the control of a standard debugger as available under a particular operating system. A user may wish to debug a process from the beginning of its execution. Alternatively, the user may wish to debug a process only if it encounters an error condition, i.e. when it transitions to the PS_ERROR process state.

In the preferred embodiment, when a process is started (using the Start Process command), it can be specified to be run in any of three "debug modes": DEBUG_NONE, DEBUG_START, and DEBUG_TRACE. No debugger will be run on a process in the DEBUG_NONE debug mode. Processes specified with the DEBUG_START mode will be run from the beginning with a debugger attached. Processes specified with the DEBUG_TRACE mode will be monitored by the agent 24, and if they should go into any of various detectable error conditions (which may include error traps, signals, or aborts), they will be stopped and a debugger will be run attached to the failing process.

In the preferred embodiment, an agent 24 does not autonomously start the debugger. Instead, when a process is in need of debugging (as indicated by the debug mode), the agent 24 transitions the process to the PS_DEBUG process state. This causes the aggregate process state to transition to PS_DEBUG. This state is communicated to the driver program 14 (for example, this state will terminate a wait condition). At that time, the driver program 14 can invoke a debugger for the process using a "debug" RPC command. This command specifies a program to be executed, presumably a shell script, to which will be passed sufficient information (via the argument list) to start a debugger of choice.

Recovery

Each agent maintains a local phase number and state which is stored in its Agent SDB. The phase number is kept in sync with that of the host program 12 via the prepare/commit protocol. The phase state is derived principally from the process state, and is used by the driver program 14 to compute the state of the current phase for the application as a whole.

When the driver program 14 mis re-invoked after a failure, the driver program 14 tells the host program 12 to start a job. If a "recovery file" is found, then the host program 12 enters "recovery mode," and recovers the state of the agents 24 as follows:

(1) The Host SDB is used to determine the set of agent 24 processes running at the time of the failure.

(2) A new agent 24 is created on each such node.

(3) Each agent 24 is given a "Start Agent" command with the Job ID.

(4) The agents 24 recognizes this Job ID as an existing application, because the Agent SDB still exists (its name is derived from the Job ID).

(5) Each agent 24 opens its SDB, which is reconstructed from its log, and extracts the current phase number, state, and commit-rollback list.

(6) If the host program 12 is in state other than COMMITTING, it will then transmit a Rollback command to the agents 24, which causes the agents 24 to undo all operations performed in that phase, in reverse order. If, on the other hand, the host program 12 was in the COMMITTING state, it will re-issue a Commit command to the agents 24. Any agent 24 which finds itself in the COMMITTING state will complete what was evidently an interrupted commit operation by traversing the commit-rollback list in forward order, executing the commit methods of all entries. Any agent 24 which finds itself in the RUNNING state will treat the Commit command as a Null command (since the prior Commit operation evidently had completed on its node but not on some other nodes).

(7) At that point, the agents 24 consider themselves to be at the start of that phase in the RUNNING state, and can proceed to take commands from the driver program 14.

Summary

Figure 4:
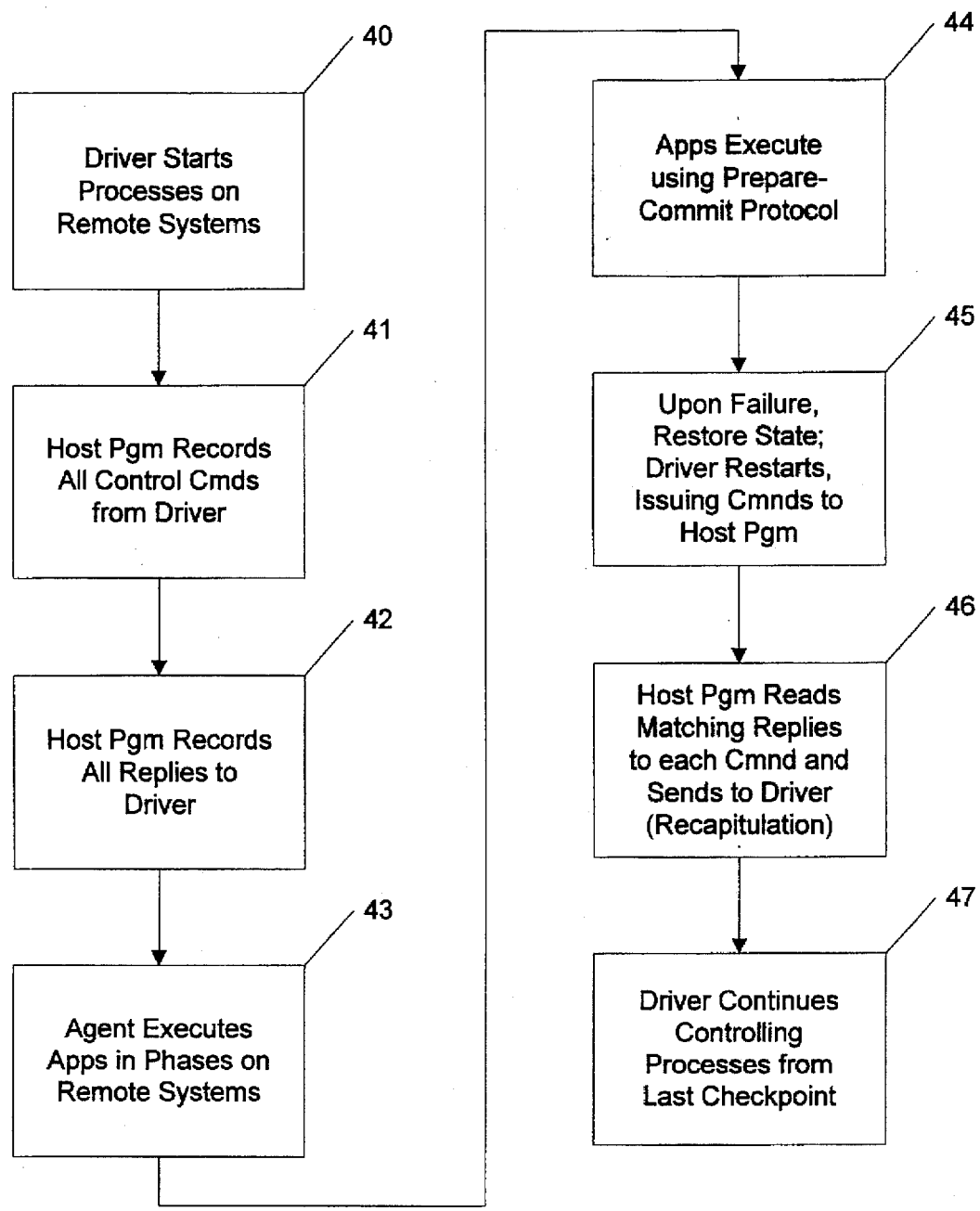
FIG. 4 is a flow chart showing in summary form the basic functional operations of the recapitulation embodiment of the present invention.

FIG. 4 is a flow chart showing in summary form the basic functional operations of the recapitulation embodiment of the present invention. The driver program 14 starts processes on remote systems 20 (Step 40). The host program 12 records all control commands from the driver program 14 (Step 41), as well as all replies to the driver program 14 (Step 42). Each agent 24 executes an application in phases on its respective remote system 20 (Step 43). The applications execute a prepare-commit protocol to store system and file states while maintaining system consistency (Step 44). If a failure occurs, the state of the system is restored and the driver program 14 restarts, issuing commands to the host program 12 (Step 45). The host program 12 reads matching replies for each command and sends the replies to the driver program 14, in a recapitulation mode, until done (Step 46). The driver program 14 then continues controlling the application processes from the last good checkpoint (Step 47).

Figure 5:
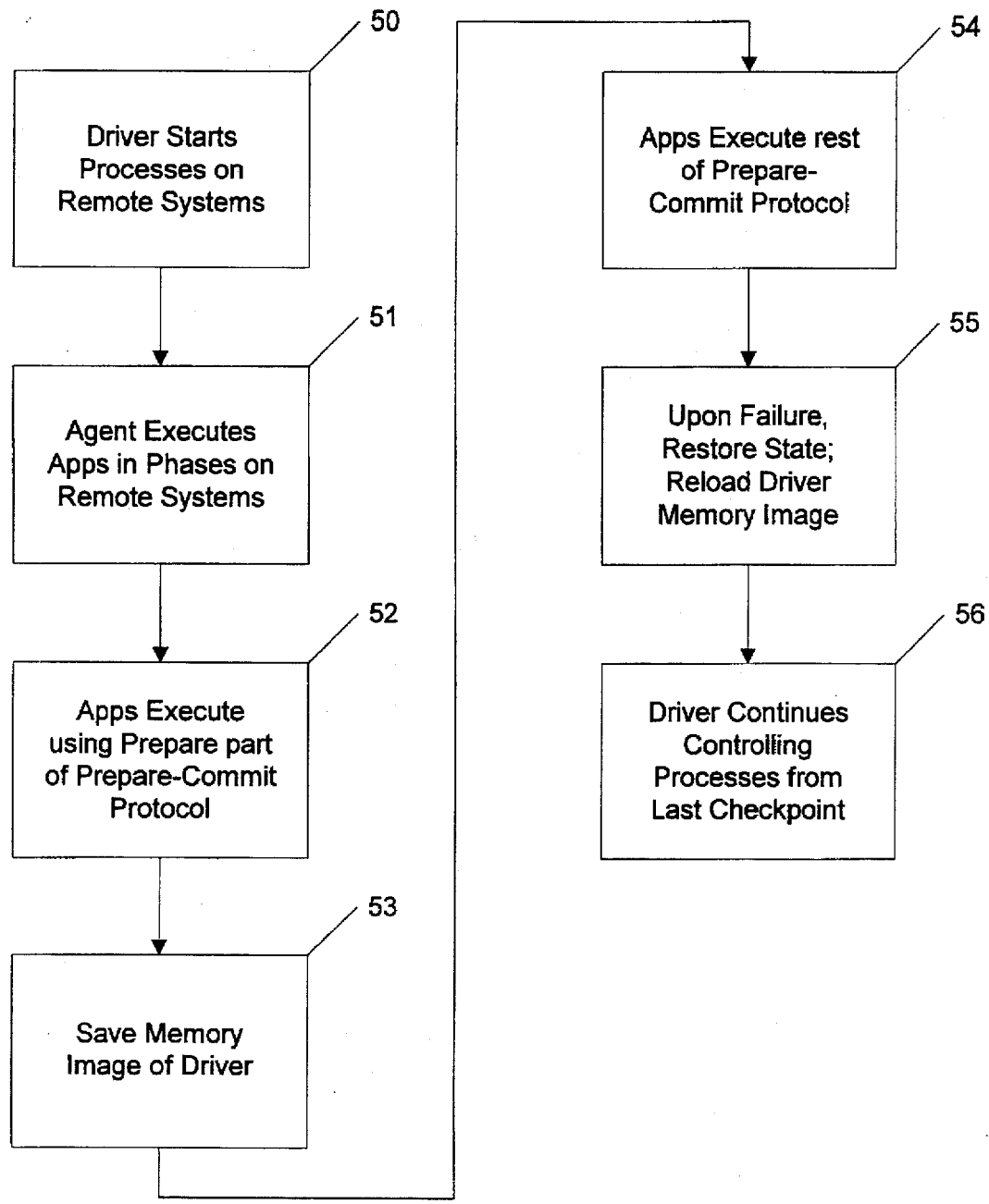
FIG. 5 is a flow chart showing in summary form the basic functional operations of the restoration embodiment of the present invention.

FIG. 5 is a flow chart showing in summary form the basic functional operations of the restoration embodiment of the present invention. The driver program 14 starts processes on remote systems 20 (Step 50). Each agent 24 executes an application in phases on its respective remote system 20 (Step 51). The applications execute the prepare part of a commit protocol to store system and file states (Step 52). A memory image of the driver program 14 is stored after the prepare protocol is done (Step 53). The applications execute a commit protocol to complete saving of the system and file states while maintaining system consistency (Step 54). If a failure occurs, the state of the system is restored and the stored memory image of the driver program 14 is reloaded into memory (Step 55). The driver program 14 then continues controlling the application processes from the last good checkpoint (Step 56).

A number of embodiments of the present invention have been described. Nevertheless, it will be understood that various modifications may be made without departing from the spirit and scope of the invention. For example, the invention could be applied to single-CPU systems. Further, although a two-phase commit protocol is preferred, other commit protocols that safely save system state while maintaining system consistency may be used. Accordingly, it is to be understood that the invention is not to be limited by the specific illustrated embodiment, but only by the scope of the appended claims.

What is claimed is:

1. A method for executing a computer application on a parallel processing system, where such application does not have pre-programmed checkpointing capability, comprising the steps of:
 (a) executing an application in distinct execution phases on a parallel processing system;
 (b) controlling processing of each execution phase of the application by issuing commands and replies to such commands;
 (c) recording all such commands and replies to such commands;
 (d) saving the end-state of each successfully completed execution phase;
 (e) detecting failure of the application in any of such execution phases;
 (f) restoring the last saved end-state of the execution phase prior to the execution phase in which failure was detected;
 (g) recapitulating all recorded commands and replies to such commands from the beginning of execution of the application up through the last saved end-state of the execution phase prior to the execution phase in which failure was detected;
 (h) restarting the application at the beginning of the execution phase in which failure was detected.

2. A computer program for executing a computer application on a parallel processing system, where such application does not have pre-programmed checkpointing capability, the computer program being stored on a media readable by a computer system, for configuring the computer system upon being read and executed by the computer system to:
 (a) execute an application in distinct execution phases on a parallel processing system;
 (b) control processing of each execution phase of the application by issuing commands and replies to such commands;
 (c) record all such commands and replies to such commands;
 (d) save the end-state of each successfully completed execution phase;
 (e) detect failure of the application in any of such execution phases;
 (f) restore the last saved end-state of the execution phase prior to the execution phase in which failure was detected;
 (g) recapitulate all recorded commands and replies to such commands from the beginning of execution of the application up through the last saved end-state of the execution phase prior to the execution phase in which failure was detected;
 (h) restart the application at the beginning of the execution phase in which failure was detected.

3. A computer-readable storage medium, configured with a computer program for executing a computer application on a parallel processing system, where such application does not have pre-programmed checkpointing capability, where the storage medium so configured causes a computer to operate in a specific and predefined manner to perform the functions of:
 (a) executing an application in distinct execution phases on a parallel processing system;
 (b) controlling processing of each execution phase of the application by issuing commands and replies to such commands;
 (c) recording all such commands and replies to such commands;
 (d) saving the end-state of each successfully completed execution phase;
 (e) detecting failure of the application in any of such execution phases;
 (f) restoring the last saved end-state of the execution phase prior to the execution phase in which failure was detected;
 (g) recapitulating all recorded commands and replies to such commands from the beginning of execution of the application up through the last saved end-state of the execution phase prior to the execution phase in which failure was detected;
 (h) restarting the application at the beginning of the execution phase in which failure was detected.

4. A method for executing a computer application on a parallel processing system, where such application does not have pre-programmed checkpointing capability, comprising the steps of:
 (a) dividing an application into distinct execution phases;
 (b) starting execution of the application on a parallel processing system;

(c) controlling processing of each execution phase of the application by issuing commands and replies to such commands;

(d) recording all such commands and replies to such commands;

(e) saving the end-state of each successfully completed execution phase by a two-phase commit protocol;

(f) detecting failure of the application in any of such execution phases;

(g) restoring the last saved end-state of the execution phase prior to the execution phase in which failure was detected;

(h) recapitulating all recorded commands and replies to such commands from the beginning of execution of the application up through the last saved end-state of the execution phase prior to the execution phase in which failure was detected;

(i) restarting the application at the beginning of the execution phase in which failure was detected.

5. A computer program for executing a computer application on a parallel processing system, where such application does not have pre-programmed checkpointing capability, the computer program being stored on a media readable by a computer system, for configuring the computer system upon being read and executed by the computer system to:

(a) divide an application into distinct execution phases;

(b) start execution of the application on a parallel processing system;

(c) control processing of each execution phase of the application by issuing commands and replies to such commands;

(d) record all such commands and replies to such commands;

(e) save the end-state of each successfully completed execution phase by a two-phase commit protocol;

(f) detect failure of the application in any of such execution phases;

(g) restore the last saved end-state of the execution phase prior to the execution phase in which failure was detected;

(h) recapitulate all recorded commands and replies to such commands from the beginning of execution of the application up through the last saved end-state of the execution phase prior to the execution phase in which failure was detected;

(i) restart the application at the beginning of the execution phase in which failure was detected.

6. A computer-readable storage medium, configured with a computer program for executing a computer application on a parallel processing system, where such application does not have pre-programmed checkpointing capability, where the storage medium so configured causes a computer to operate in a specific and predefined manner to perform the functions of:

(a) dividing an application into distinct execution phases;

(b) starting execution of the application on a parallel processing system;

(c) controlling processing of each execution phase of the application by issuing commands and replies to such commands;

(d) recording all such commands and replies to such commands;

(e) saving the end-state of each successfully completed execution phase by a two-phase commit protocol;

(f) detecting failure of the application in any of such execution phases;

(g) restoring the last saved end-state of the execution phase prior to the execution phase in which failure was detected;

(h) recapitulating all recorded commands and replies to such commands from the beginning of execution of the application up through the last saved end-state of the execution phase prior to the execution phase in which failure was detected;

(i) restarting the application at the beginning of the execution phase in which failure was detected.

7. A method for executing a computer application on a parallel processing system, where such application does not have pre-programmed checkpointing capability, comprising the steps of:

(a) executing an application in distinct execution phases on a parallel processing system;

(b) controlling processing of each execution phase of the application by a driver program;

(c) saving the end-state of each successfully completed execution phase;

(d) saving, at the end of each successfully completed execution phase, at least those data structures of the driver program necessary to recreate a saved state for the driver program;

(e) detecting failure of the application in any of such execution phases;

(f) restoring the last saved end-state of the execution phase prior to the execution phase in which failure was detected;

(g) restoring the driver program by reloading into memory the saved data structures of the driver program up through the end of the execution phase prior to the execution phase in which failure was detected;

(h) restarting the application at the beginning of the execution phase in which failure was detected.

8. A computer program for executing a computer application on a parallel processing system, where such application does not have pre-programmed checkpointing capability, the computer program being stored on a media readable by a computer system, for configuring the computer system upon being read and executed by the computer system to:

(a) execute an application in distinct execution phases on a parallel processing system;

(b) control processing of each execution phase of the application by a driver program;

(c) save the end-state of each successfully completed execution phase;

(d) save, at the end of each successfully completed execution phase, at least those data structures of the driver program necessary to recreate a saved state for the driver program;

(e) detect failure of the application in any of such execution phases;

(f) restore the last saved end-state of the execution phase prior to the execution phase in which failure was detected;

(g) restore the driver program by reloading into memory the saved data structures of the driver program up through the end of the execution phase prior to the execution phase in which failure was detected;

(h) restart the application at the beginning of the execution phase in which failure was detected.

9. A computer-readable storage medium, configured with a computer program for executing a computer application on a parallel processing system, where such application does not have pre-programmed checkpointing capability, where the storage medium so configured causes a computer to operate in a specific and predefined manner to perform the functions of:

(a) executing an application in distinct execution phases on a parallel processing system;

(b) controlling processing of each execution phase of the application by a driver program;

(c) saving the end-state of each successfully completed execution phase;

(d) saving, at the end of each successfully completed execution phase, at least those data structures of the driver program necessary to recreate a saved state for the driver program;

(e) detecting failure of the application in any of such execution phases;

(f) restoring the last saved end-state of the execution phase prior to the execution phase in which failure was detected;

(g) restoring the driver program by reloading into memory the saved data structures of the driver program up through the end of the execution phase prior to the execution phase in which failure was detected;

(h) restarting the application at the beginning of the execution phase in which failure was detected.

10. A method for executing a computer application on a parallel processing system, where such application does not have pre-programmed checkpointing capability, comprising the steps of:

(a) dividing an application into distinct execution phases;

(b) starting execution of the application on a parallel processing system;

(c) controlling processing of each execution phase of the application by a driver program;

(d) saving the end-state of each successfully completed execution phase by a two-phase commit protocol;

(e) saving, at the end of each successfully completed execution phase, at least those data structures of the driver program necessary to recreate a saved state for the driver program;

(f) detecting failure of the application in any of such execution phases;

(g) restoring the last saved end-state of the execution phase prior to the execution phase in which failure was detected;

(h) restoring the driver program by reloading into memory the saved data structures of the driver program up through the end of the execution phase prior to the execution phase in which failure was detected;

(i) restarting the application at the beginning of the execution phase in which failure was detected.

11. A computer program for executing a computer application on a parallel processing system, where such application does not have pre-programmed checkpointing capability, the computer program being stored on a media readable by a computer system, for configuring the computer system upon being read and executed by the computer system to:

(a) divide an application into distinct execution phases;

(b) start execution of the application on a parallel processing system;

(c) control processing of each execution phase of the application by a driver program;

(d) save the end-state of each successfully completed execution phase by a two-phase commit protocol;

(e) save, at the end of each successfully completed execution phase, at least those data structures of the driver program necessary to recreate a saved state for the driver program;

(f) detect failure of the application in any of such execution phases;

(g) restore the last saved end-state of the execution phase prior to the execution phase in which failure was detected;

(h) restore the driver program by reloading into memory the saved data structures of the driver program up through the end of the execution phase prior to the execution phase in which failure was detected;

(i) restart the application at the beginning of the execution phase in which failure was detected.

12. A computer-readable storage medium, configured with a computer program for executing a computer application on a parallel processing system, where such application does not have pre-programmed checkpointing capability, where the storage medium so configured causes a computer to operate in a specific and predefined manner to perform the functions of:

(a) dividing an application into distinct execution phases;

(b) starting execution of the application on a parallel processing system;

(c) controlling processing of each execution phase of the application by a driver program;

(d) saving the end-state of each successfully completed execution phase by a two-phase commit protocol;

(e) saving, at the end of each successfully completed execution phase, at least those data structures of the driver program necessary to recreate a saved state for the driver program;

(f) detecting failure of the application in any of such execution phases;

(g) restoring the last saved end-state of the execution phase prior to the execution phase in which failure was detected;

(h) restoring the driver program by reloading into memory the saved data structures of the driver program up through the end of the execution phase prior to the execution phase in which failure was detected;

(i) restarting the application at the beginning of the execution phase in which failure was detected.

* * * * *